(12) United States Patent
Miyasaka et al.

(10) Patent No.: US 9,938,181 B2
(45) Date of Patent: Apr. 10, 2018

(54) WHITE GLASS

(71) Applicant: ASAHI GLASS COMPANY, LIMITED, Tokyo (JP)

(72) Inventors: Junko Miyasaka, Tokyo (JP); Seiki Ohara, Tokyo (JP); Kenji Kitaoka, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 9 days.

(21) Appl. No.: 14/811,178

(22) Filed: Jul. 28, 2015

(65) Prior Publication Data

US 2015/0329409 A1 Nov. 19, 2015

Related U.S. Application Data

(63) Continuation of application No. PCT/JP2014/051989, filed on Jan. 29, 2014.

(30) Foreign Application Priority Data

Jan. 29, 2013 (JP) .................. 2013-014589

(51) Int. Cl.
C03C 3/097 (2006.01)
C03C 4/02 (2006.01)
C03C 3/093 (2006.01)
C03C 21/00 (2006.01)

(52) U.S. Cl.
CPC .............. C03C 3/097 (2013.01); C03C 3/093 (2013.01); C03C 4/02 (2013.01); C03C 21/002 (2013.01); *Y10T 428/131* (2015.01); *Y10T 428/315* (2015.01)

(58) Field of Classification Search
CPC ........... C03C 1/04; C03C 3/097; C03C 4/005; C03C 4/02
See application file for complete search history.

(56) References Cited

U.S. PATENT DOCUMENTS

| | | | |
|---|---|---|---|
| 4,298,390 A | 11/1981 | Flannery et al. | |
| 4,309,218 A | 1/1982 | Flannery et al. | |
| 5,591,683 A | 1/1997 | Stempin et al. | |
| 6,745,057 B1 | 6/2004 | Hankui | |
| 2014/0194270 A1 | 7/2014 | Shiratori et al. | |

FOREIGN PATENT DOCUMENTS

| | | | | |
|---|---|---|---|---|
| CN | 1066834 A | | 12/1992 | |
| CN | 101244889 A | * | 8/2008 | |
| CN | 104507885 A | | 4/2015 | |
| JP | S57-111258 A | | 7/1982 | |
| JP | 08277142 A | * | 10/1996 | ............. C03C 3/062 |
| JP | H08-277142 A | | 10/1996 | |
| JP | 2006-062929 A | | 3/2006 | |
| JP | 3838815 B2 | | 10/2006 | |
| JP | 2010-255188 A | | 11/2010 | |
| JP | 2011-226156 A | | 11/2011 | |
| JP | 2012-197206 A | | 10/2012 | |
| WO | WO 2013/011897 A1 | | 1/2013 | |

OTHER PUBLICATIONS

International Search Report dated May 13, 2014, in PCT/JP2014/051989 filed Jan. 29, 2014 (W/ English translation).

* cited by examiner

*Primary Examiner* — Elizabeth A. Bolden

(74) *Attorney, Agent, or Firm* — Oblon, McClelland, Maier & Neustadt, L.L.P.

(57) ABSTRACT

A white glass includes, in terms of mole percentage on the basis of oxides, from 50% to 74% of $SiO_2$, from 0 to 8% of $B_2O_3$, from 1% to 8% of $Al_2O_3$, from 0 to 18% of MgO, from 0 to 7% of CaO, from 0 to 10% of SrO, from 0 to 12% of BaO, from 0 to 5% of $ZrO_2$, from 5% to 15% of $Na_2O$ and from 2% to 10% of $P_2O_5$. In the white glass, a total content of CaO, SrO and BaO is from 1% to 22%, a total content RO of MgO, CaO, SrO and BaO is from 5% to 25% and a ratio CaO/RO of a content of CaO to the RO is 0.7 or less.

26 Claims, No Drawings

US 9,938,181 B2

WHITE GLASS

TECHNICAL FIELD

The present invention relates to a white glass which can be suitably used for a housing of an electronic device, such as a portable and usable communication or information device, or as a building material for buildings or constructions (civil structures).

BACKGROUND ART

For housings of electronic devices such as a mobile phone, considering various factors, such as decorativeness, scratch resistance, processability and cost, those chosen as appropriate from resins have been used. A housing of a portable terminal in particular has been often constituted of materials such as plastics or resins (see Patent Document 1).

A gallery or a tunnel is high in temperature and humidity on the inside thereof and air therein is polluted, and hence its wall surface deteriorates fast. In addition, no daylight is shining on the inside of a gallery or a tunnel, and artificial lighting is therefore required during not only nighttime but also daytime. Great amounts of electric power are consumed by lighting of galleries and tunnels scattered throughout the country, and power savings have therefore been hastened.

As a material for the interior part of the gallery or tunnel, tiles with high reflectance have been used traditionally. The use of highly reflective tiles allows reduction in number of lighting fixtures, and it has yielded energy savings. In addition, visibility enhancement has been effected. As to the currently-used interior tiles for tunnels, application of coatings of glaze to their respective ceramic substrates has been carried out for the purpose of enhancing the ability to be cleaned, reflectance or strength.

For example, light-reflecting tiles for interior use of a tunnel have been described in Patent Document 2, wherein the tiles each has had a plurality of particulate asperities formed on a substrate surface thereof and the substrate surface has been coated with glaze for the purpose of increasing the strength thereof. Further in the document, the glaze rendered whitish by incorporation of zirconia into transparent glaze has been mentioned as a white glaze.

Furthermore, highly reflective white tiles to be used as a building material or wall material of buildings have been described in Patent Document 3, wherein there has been a description that contamination control treatment using glaze has been given to the tiles as required.

PRIOR ART DOCUMENTS

Patent Documents

Patent Document 1: Japanese Patent No. 3838815
Patent Document 2: JP-A-2010-255188
Patent Document 3: JP-A-2011-226156

SUMMARY OF THE INVENTION

Problems that the Invention is to Solve

However, when a housing is constituted of materials such as plastics or resins, there is a problem that the housing is prone to scratches. An object of the present invention is therefore to provide a scratch-resistant white glass suitable for use as housings of electronic devices.

In addition, in the case of laying tiles in a gallery or a tunnel, even though glaze had been put on the surface of each tile, there has been a concern that scratches made on the tile surface by handling under the execution of construction might cause reduction in ability to be cleaned, reflection capability or strength.

Accordingly, an object of the present invention is to provide a glass which has an anti-scratch surface and can retain its washability, reflection capability and strength, and can be used suitably e.g. as a building material for an interior use of a gallery or tunnel.

The present invention provides the following aspects.

1. A white glass comprising, in terms of mole percentage on the basis of oxides, from 50% to 74% of $SiO_2$, from 0 to 8% of $B_2O_3$, from 1% to 8% of $Al_2O_3$, from 0 to 18% of MgO, from 0 to 7% of CaO, from 0 to 10% of SrO, from 0 to 12% of BaO, from 0 to 5% of $ZrO_2$, from 5% to 15% of $Na_2O$ and from 2% to 10% of $P_2O_5$, wherein a total content of CaO, SrO and BaO is from 1% to 22%, a total content RO of MgO, CaO, SrO and BaO is from 5% to 25% and a ratio CaO/RO of a content of CaO to the RO is 0.7 or less.

2. The white glass according to the above item 1, which comprises, in terms of mole percentage on the basis of oxides, from 50% to 70% of $SiO_2$, from 0 to 8% of $B_2O_3$, from 1% to 8% of $Al_2O_3$, from 0 to 18% of MgO, from 0 to 7% of CaO, from 0 to 10% of SrO, from 0 to 12% of BaO, from 0 to 5% of $ZrO_2$, from 5% to 15% of $Na_2O$ and from 2% to 10% of $P_2O_5$, wherein the total content of CaO, SrO and BaO is from 1% to 15%, the total content RO of MgO, CaO, SrO and BaO is from 10% to 25% and the ratio CaO/RO of the content of CaO to the RO is 0.7 or less.

3. The white glass according to the above item 1 or 2, which comprises 0% or more and less than 11% of MgO.

4. The white glass according to any one of the above items 1 to 3, which comprises from 55% to 62% of $SiO_2$, from 2% to 7% of $Al_2O_3$, from 4% to 10% of MgO, from 8% to 12% of $Na_2O$ and from 3% to 7% $P_2O_5$.

5. The white glass according to any one of the above items 1 to 4, which comprises 9% or more of $Na_2O$.

6. The white glass according to any one of the above items 1 to 5, which comprises 0.5% or more of $ZrO_2$.

7. The white glass according to any one of the above items 1 to 6, wherein a ratio $CaO/P_2O_5$ of the content of CaO to a content of $P_2O_5$ is 1.5 or less.

8. The white glass according to any one of the above items 1 to 7, which comprises 1% or more of BaO.

9. The white glass according to any one of the above items 1 to 8, wherein a crystal is not precipitated.

10. The white glass according to any one of the above items 1 to 9, wherein a linear transmittance of light having a wavelength of 600 nm is 2% or less.

11. The white glass according to any one of the above items 1 to 10, which is for use in a building material.

12. The white glass according to the above item 11, which is for an interior use of a gallery or tunnel.

13. A white glass comprising, in terms of mole percentage on the basis of oxides, from 50% to 72% of $SiO_2$, from 0 to 8% of $B_2O_3$, from 1% to 8% of $Al_2O_3$, from 0 to 18% of MgO, from 0 to 7% of CaO, from 0 to 10% of SrO, from 0 to 12% of BaO, from 0 to 5% of $ZrO_2$, from 5% to 15% of $Na_2O$ and from 2% to 10% of $P_2O_5$, wherein a total content of CaO, SrO and BaO is from 1% to 20%, a total content RO of MgO, CaO, SrO and BaO is from 6% to 25% and a ratio CaO/RO of a content of CaO to the RO is 0.7 or less, and the white glass has a compressive stress layer in a surface thereof.

14. The white glass according to the above item 13, which comprises, in terms of mole percentage on the basis of oxides, from 50% to 70% of $SiO_2$, from 0 to 8% of $B_2O_3$, from 1% to 8% of $Al_2O_3$, from 0 to 18% of MgO, from 0 to 7% of CaO, from 0 to 10% of SrO, from 0 to 12% of BaO, from 0 to 5% of $ZrO_2$, from 5% to 15% of $Na_2O$ and from 2% to 10% of $P_2O_5$, wherein the total content of CaO, SrO and BaO is from 1% to 15% and the total content RO of MgO, CaO, SrO and BaO is from 10% to 25%.

15. The white glass according to the above item 13 or 14, wherein the compressive stress layer has a thickness of 10 μm or more and a surface compressive stress thereof is 300 MPa or more.

16. The white glass according to any one of the above items 13 to 15, wherein a total light reflectance of light having a wavelength of 600 nm is 45% or more.

17. A white glass which is in a phase-separated state, wherein a total content of CaO, SrO and BaO is from 1% to 22% and a linear transmittance of light having a wavelength of 600 nm at a thickness of 1 mm is 2% or less.

18. The white glass according to the above item 17, which comprises from 2% to 10% of $P_2O_5$.

19. The white glass according to the above item 17 or 18, which comprises from 50% to 74% of $SiO_2$.

20. The white glass according to any one of the above items 17 to 19, having a compressive stress layer in a surface thereof, wherein the compressive stress layer has a thickness of 10 μm or more and a surface compressive stress thereof is 300 MPa or more.

21. A housing using the white glass according to any one of the above items 1 to 10 and 13 to 20.

22. An electronic device, comprising the housing according to the above item 21.

23. The electronic device according to the above item 22, which is a portable and usable communication device or portable and usable information device.

24. The white glass according to any one of the above items 13 to 20, which is for use in a building material.

25. The white glass according to the above item 24, which is for an interior use of a gallery or tunnel.

Advantageous Effects of the Invention

According to the present invention, a scratch-resistant material suitable as a housing of an electronic device is obtained.

By the way, the electronic device described above includes a display device such as a liquid crystal panel on an outer surface thereof. However, those display devices tend to have high definition and high luminance, and with this tendency, a backlight as a light source tends to have high luminance. Light from a light source is emitted to a display device side, and in addition to this, frequently multiply reflects in the inside of a device and reaches a rear surface of an exterior housing.

Even in an organic EL (Electro-Luminescence) display that does not require a light source, similarly, there is concern over light leakage from a light-emitting element. In the case of using a metal as a material of a housing, the problem does not occur, but in the case where a material is a while material but has transparency, there is a possibility that light from a light source passes through the housing and is recognized from the outside of the device. In the case of using such a transparent while material in a housing, a light-shielding means such as a coating film for imparting a shielding property to a visible light (hereinafter simply referred to as a "shielding property") for the while material is formed on a rear surface of a glass.

However, with high luminance of a light source of a display device as described above, in order to form a coating film having sufficient shielding property on a rear surface (a device side) of the transparent white material, it is necessary to form a thick coating film or form a film including a plurality of layers, and this increases the number of steps, leading to the increase of cost.

Furthermore, in the case where a coating film is not uniformly formed, light passes through only a thin portion of the coating film, and a housing is locally recognized brightly, and thus, beauty of the device may be impaired. For example, in a concave housing, it is necessary to form a uniform film on the entire surface of a concave surface side. However, a step of uniformly forming a coating film having sufficient shielding property on the concave surface is complicated, and this leads to the increase of cost.

Particularly, in the case of obtaining a housing having white appearance, it is assumed that a white coating layer should be formed on at least one surface of the transparent while material as described above. However, a white coating material has high transparency, and even thought a thickness of the while coating layer is increased, sufficient shielding property cannot be obtained.

For this reason, it is assumed that a black coating layer having high shielding property should be laminated to the white coating layer. However, in this case, it is necessary to increase a thickness of the white coating layer to an extent such that the black coating layer is not recognized. Thus, to obtain a white-colored housing having high shielding property using a white coating material, there is a problem that cost is very high.

According to the present invention, a white material having low transparency can be obtained, and without additionally providing a light-shielding means like the light-shielding film as mentioned above, a white glass having the light-shielding property suitable for housings of electronic devices can be obtained at a low price. In addition, a white glass usable for housings with designability can be obtained at a low price.

When the glaze layer on the surface of tiles, which have been used for decorating the interior part of a gallery or a tunnel, begins to scale, the ceramic substrate of each tile becomes bare and tends to get contaminated, and the contaminants adhering thereto resist being removed. In contrast to such tiles, when the glass for building material in the present invention is used for decorating the interior part of a gallery or tunnel, the glass surface resists scratches and adhesion of contaminants, has excellent washability, and can retain reflection capability.

MODE FOR CARRYING OUT THE INVENTION

Preferred embodiments of the white glass in the present invention are described below.

The white glass in the present invention is, for example, mounted on an electronic device externally. A mobile phone has a configuration that a display unit including a liquid crystal panel or an organic EL display and an operating unit including buttons or a combination of display and operating units in one, such as a touch panel, is placed on one of the outer surfaces and the peripheries are surrounded with a casing member. The other of the outer surfaces is formed of a panel. And a frame member is placed in a space between one outer surface and the other outer surface, namely a thickness portion of the device. The casing member and frame member, or the panel and the frame member may be formed into a single piece in some cases.

The white glass in the present invention can be used for any of the foregoing casing member, panel and frame member. In addition, these members each may have a flat shape, or they each may have a curved shape, and a combination structure of casing member and frame member or a combination structure of panel and frame member may be concave in shape or convex in shape.

The light source of a display device installed in the interior of an electronic device is constituted of a white-light emission unit, such as a light-emitting diode, organic EL or CCFL. In addition, there is a light source having a light-emitting element to emit white light or the like without using the light emission unit, such as an organic EL display. When white light leaks into the outside of a device through a white-glass housing, the device does not look fine. Therefore, it is preferable that the white glass housing has the property of ensuring shielding of white light.

Reasons why the white glass in the present invention is suitable for housings are as follows. The white glass is a glass (phase-separated glass) in the interior of which fine particles in a separated state are precipitated, and it has excellent mechanical strength and scratch resistance. And the particles in the separated phase in the glass diffuse, reflect and scatter light at their boundaries, and thus, an appearance of the glass shows a white color. The white glass in the present invention makes it difficult for white light passing through the glass (light from a light source of a display device) to be perceived on the surface side of the glass by utilizing the light-scattering property of phase-separated glass, or it has designability.

In the white glass and strengthened white glass in the present invention (hereafter there are cases where they both are collectively called the white glass without drawing a distinction between them), the linear transmittance of light having a wavelength of 600 nm at a thickness of 1 mm is desirably 2% or less.

In the white glass and strengthened white glass in the present invention, the total light reflectance $R_{600}$ of light having a wavelength of 600 nm is desirably 45% or more. When $R_{600}$ is less than 45%, there is a fear that the glass may have insufficient light-shielding property. $R_{600}$ is typically 50% or more.

The total light reflectance $R_{600}$ can be determined by the method described later in Examples.

The phase-separation in glass means that single-phase glass is separated into two or more glass phases. Example of a method for causing phase-separation in glass include a method of giving heat treatment to glass after forming the glass and a method of holding glass at a temperature higher than its phase-separation temperature before forming the glass.

As to conditions under which heat treatment of the glass is carried out for phase-separation, the temperature for the heat treatment is typically 50° C. to 400° C. higher, preferably 100° C. to 300° C. higher, than the glass transition point or annealing point of the glass, and the time for heat treatment of the glass is preferably 1 to 64 hours, and more preferably 2 to 32 hours. From the viewpoint of mass productivity, the time for the heat treatment is preferably 24 hours or less, still preferably 12 hours or less.

As the method of holding glass at a temperature equal to or higher than its phase-separation temperature before forming the glass, a method of causing phase-separation in glass by holding the glass at a temperature equal to or lower than the phase-separation starting temperature, and that higher than 1,200° C. is preferable. Because phase-separation is performed at a high temperature, it becomes possible to whiten the glass in a short time.

Whether or not the glass is phase-separated can be determined by observation by SEM (scanning electron microscope). In the case of phase-separated glass, separation into two or more phases can be observed by SEM.

The phase-separated glass in the present invention is in a whitened state (namely, low in linear transmittance). When the phase-separated glass which has been whitened, thereby having the light-shielding property is formed into housings, housings having white appearance and providing high shielding property can be obtained at low cost without using additional light-shielding means. In addition, the housings obtained can have designability.

Examples of a state of phase-separated glass include a binodal state and a spinodal state. The binodal state is a phase-separated state caused by a nucleation-growth mechanism, and is generally spherical in shape. In addition, the spinodal state is a state in which separated phases intertwine with each other continuously in three dimensions while having somewhat regularity.

Considering fracture by dropping shock during the use or contact scratches resulting from long-term use, an electronic device usable as a mobile phone or the like requires its housing having high strength. Until now, with the intention of enhancing scratch resistance of a glass substrate, glass has been chemically strengthened, thereby forming a compressive stress layer in the glass surface, resulting in the improvement of scratch resistance of a glass substrate. When a phase-separated glass for chemical strengthening in the present invention is converted into chemically-strengthened glass by undergoing ion-exchange treatment, the glass can have a compressive stress layer in the surface, thereby having high strength.

Chemical strengthening is a method of forming a compressive stress layer in the surface of glass, thereby increasing strength of the glass.

More specifically, it is a treatment that replaces alkali metal ions having small ion radius (typically Li ions or Na ions) in a surface portion of glass with alkali ions having larger ion radius (typically Na ions or K ions for Li ions, or K ions for Na ions) through the ion exchange at a temperature equal to or less than glass transition point.

The method for chemical strengthening has no particular restrictions so long as it allows ion exchange between $Li_2O$ or $Na_2O$ in a surface layer of glass and $Na_2O$ or $K_2O$ in a molten salt, respectively. Examples of the method include a method of immersing a glass in heated molten potassium nitrate ($KNO_3$).

For heightening surface compressive stress in a chemically-strengthened layer, which comes to have surface compressive stress when the phase-separated glass for chemical strengthening in the present invention undergoes ion-exchange treatment, it is desirable that the phase-separated glass to be subjected to ion-exchange treatment be in the binodal state. In particular, it is preferred that a silica-rich disperse phase, which also contains other elements, be present in a matrix rich in alkali.

The white glass obtained by subjecting to the heat treatment under the conditions falling within the foregoing ranges easily undergoes ion exchange, and the ion-exchange treatment can give the phase-separated glass not only the light-shielding property but also high strength suitable for housings.

As to conditions for forming a chemically-strengthened layer having a desired surface compressive stress (a surface compressive stress layer) in a glass, though they vary depending on the thickness of the glass, the suitable time spent in performing ion exchange treatment is from 1 hour to 72 hours, preferably from 2 hours to 24 hours. For productivity improvement, it is desirable that the ion-exchange treatment time be 12 hours or less. As an example of the molten salt, examples thereof include $KNO_3$. More specifically, it is typical to immerse a glass e.g. in $KNO_3$ molten salt of 400° C. to 500° C. for 1 to 72 hours.

In the producing of chemically-strengthened glass to be used for housings, sometimes a polishing step is performed when the glass has a plate form. In the step of polishing the glass, the size of abrasive grains to be used for polishing in the final stage is typically 2 μm to 6 μm, and it is thought that these abrasive grains eventually form, on the glass surface, microcracks having a size of 5 μm at the greatest.

For allowing the effect of enhancing the strength by chemical strengthening to be efficient, it is desirable that there exist a surface compressive stress layer having a depth greater than the depth of microcracks formed on the glass surface and the depth of the surface compressive stress layer generated by chemical strengthening be 5 μm or more. In addition, when the glass suffers scratches deeper than the depth of the surface compressive stress layer during the use thereof, such scratches lead to fracture of the glass. It is therefore desirable for the surface compressive stress layer to have a greater depth, and the depth of the surface compressive stress layer is preferably 10 μm or more, still preferably 20 μm or more, typically 30 μm or more.

On the other hand, when the depth of the surface compressive stress layer is large, the internal tensile stress becomes great to result in a great shock at the time of fracture. In other words, it has been found that, when the internal tensile stress is great, the glass is apt to shatter into fine pieces and scatter at the time of fracture. As to the glass having a thickness of 1 mm or less, scattering of shattered pieces of the glass became serious when the depth of the surface compressive stress layer is more than 70 μm.

The desirable depth of the surface compressive stress layer in the strengthened white glass in the present invention is therefore 70 μm or less. As to the white glass for housings in the present invention, it is also thought that, depending on the electronic devices on which the white glass is to be externally mounted, the surface compressive stress layer should be adjusted to have a small depth for safety in uses e.g. as panels having a high probability of occurrence of contact scratches on the surface. Hence, the depth is preferably 60 μm or less, still preferably 50 μm or less, typically 40 μm or less.

In addition, the surface compressive stress is desirably 300 MPa or more, preferably 400 MPa or more and 1,000 MPa or less, far preferably 900 MPa or less, further preferably 800 MPa or less, furthermore preferably 700 MPa or less.

The surface compressive stress CS (unit: MPa) and the depth of the compressive stress layer DOL (unit: μm) of the white glass in the present invention can be determined by birefringence measurements so long as the white glass is pervious to light. The measurements can be made in accordance with the method described later in Examples. In addition, the depth of the surface compressive stress layer can be measured with EPMA (Electron Probe Micro Analyzer) or so on.

In the ion-exchange treatment, when ion exchange is performed e.g. between a sodium component in the surface layer of glass and a potassium component in a molten salt, analysis of potassium ion concentrations in a depth direction of the phase-separated glass is conducted by means of EPMA, and the potassium ion diffusion depth determined by the measurement is regarded as the depth of the surface compressive stress layer.

In addition, in the ion-exchange-treatment, when the ion exchange is performed between a lithium component in the surface layer of glass and a sodium component in a molten salt, analysis of sodium ion concentrations in a depth direction of the glass is conducted by means of EPMA, and the sodium ion diffusion depth determined by the measurement is regarded as the depth of the surface compressive stress layer.

Alternatively, it is also possible to introduce surface compressive stress resulting from a thermal expansion difference into the surface portion by applying the thin coating of glass having a thermal expansion coefficient smaller than that of the chemically-strengthened glass thereto. When the clear glass is used, the effect of enhancing the appearance can be obtained through reflections from the front and rear surfaces of the coated glass.

Also, the white glass in the present invention has excellent mechanical strength. Therefore, the white glass can be preferably used for the white glass housing of the portable electronic device such as the mobile phone which is required to have high strength for housing.

Phase-separation may be accompanied by crystallization. There is a possibility that crystallization contributes to whitening (namely, reduction in linear transmittance). For this reason, a composite phase of separated phase+crystal phase is not excluded specifically. However, glass in which crystallization has progressed to an extent of leading to the reduction of strength, increasing of ion-exchange temperature and reduction of ion-exchange performance (compressive stress, stress layer thickness) is undesirable. The ratio of volume of crystal phase particles to (volume of dispersephase particles+volume of crystal particles) is desirably 50% or less, preferably 20% or less, still preferably 10% or less, still further preferably 1% or less. It is preferred that the white glass in the present invention in which crystals are not precipitated. Precipitation of crystals in the glass threatens to easily interfere with ion exchange or make it difficult to form the glass.

The phase-separated glass for chemical strengthening in the present invention has no particular restrictions as to the producing method thereof. Examples thereof include the method including the steps of mixing various ingredients in appropriate amounts, melting the resultant mixture by heating up to a temperature of about 1,500° C. to about 1,800° C., defoaming therefrom, homogenizing the resultant mixture through agitation or the like, forming the homogenized mixture into a plate or the like through the use of a conventional float process, down-draw process, press process, roll-out process or the like, or casting the homogenized mixture into a block form, annealing and then machining into an arbitrary shape, further subjecting to phase-separation treatment, machining into a desired shape, and subjecting to ion-exchange treatment.

In the present invention, the phase-separated glass is construed as also including the glass which has been phase-separated through the heat treatment for melting, homogenizing, forming, annealing or shape machining without particular treatments for phase-separation during the steps of melting, homogenizing, forming, annealing or shape-machining of glass. In this case, the step of subjecting the glass to phase-separation is construed as being included in the step of melting the glass or so on.

The white glass in the present invention may be formed into not only a flat plate shape, but a concave shape or a convex shape. In this case, a glass formed in a flat plate or a block may be reheated and press-formed in a molten state. Furthermore, a glass may be formed into a desire shape by a direct press method such that a molten glass is directly flown on a press mold and then press-formed. A portion corresponding to a display device or connector of an electronic device may be processed simultaneously with press forming, or cutting or the like may be conducted after press forming.

The white glass in the present invention can be preferably used in a portable electronic device. The meaning of the portable electronic device includes, as a concept, a portable and usable communication device or information device.

Examples of the communication device include a mobile phone, PHS (Personal Handy-phone System), a smart phone, PDA (Personal Data Assist) and PND (Portable Navigation Device, portable car navigation system), as a communication terminal, and include a portable radio, a portable television and one-segment receiver, as a broadcasting receiver.

Examples of the information device include a digital camera, a video camera, a portable music player, a sound recorder, a portable DVD player, a portable game machine, a notebook computer, a tablet PC, an electronic dictionary, an electronic organizer, an electronic book leader, a portable printer and a portable scanner, but the information device is not limited to the exemplifications.

A portable electronic device having beauty can be obtained by using the white glass in the present invention in those portable electronic devices, and when the strengthened white glass in the present invention is used, the higher strength can be obtained.

The white glass in the present invention which has high strength and beautiful appearance can also be applied to desktop personal computers, large-sized televisions, building materials (for example, a building material for an interior use of a gallery or tunnel), tableware, porous glass, furniture, household electric appliances or so on.

As to the phase-separated glass to be used as a building material (hereinafter referred to as the phase-separated glass for building material in the present invention), though it is typically no subjected to chemical strengthening, it may be subjected to chemical strengthening, or it may be subjected to physical strengthening. By strengthening it, it can have further increased strength.

On the housing for a portable electronic device in the present invention, a conductor pattern may be formed, and the front or rear surface of the housing can be used as a place for forming the pattern. In addition, the whole or a part of the conductor pattern may have a high-frequency circuit function such as an antenna or a filter. In this case, the portable electronic device has a connecting means of some kind between the conductor pattern formed on the housing and a circuit in the electronic device. As the connecting means, a cable, a flexible substrate, pins using springs, contact through a mechanism having elasticity of some kind, or the like can be utilized.

Next, the glass compositions to be used in the present invention are described below. In the specification, the contents of glass components are expressed in terms of mole percentages unless otherwise indicated.

In the present invention, $SiO_2$ is a basic component that forms a network structure of a glass. That is, $SiO_2$ constitutes an amorphous structure and develops excellent mechanical strength, weather resistance or luster as a glass. The content of $SiO_2$ is in a range of 50% to 74%. In order for the glass to retain its weather resistance, scratch resistance and chemical resistance, the content of $SiO_2$ is adjusted to 50% or more. In addition, it is desirably 53% or more, preferably 55% or more, still preferably 57% or more. On the other hand, in order not to increase the melting temperature or in order to have high scratch resistance, the content of $SiO_2$ is controlled to 74% or less. In addition, it is desirably 70% or less, preferably 68% or less, still preferably 65% or less, still further preferably 62% or less.

$B_2O_3$ is not an essential component to glass, but the glass may contain $B_2O_3$ because $B_2O_3$ not only improves melting properties of glass, but also it allows improvement in whiteness of glass, reduction in thermal expansion coefficient of glass, and further increase in weather resistance of glass. In order to avoid unevenness of whiteness, or in order to improve the uniformity of whiteness, the content thereof is controlled to 8% or less. In addition, the content thereof is desirably 7% or less, preferably 6% or less. The expression of "improvement in whiteness" and "high whiteness" as used herein means that glass has a low linear transmittance (in the following, the same as this meaning).

$Al_2O_3$ has the function of improving chemical durability of glass, and has effects of remarkably improving the dispersion stability of $SiO_2$ and other components and giving the function of homogenizing the separated phase of glass. In order to increase the uniformity of whiteness, the content thereof is adjusted to 1% or more, desirably 2% or more, preferably 3% or more. In order to avoid elevation in melting temperature of glass and increase in linear transmittance resulting from reduction in tendency to induce phase-separation, and in order to keep whiteness to a high degree, the content thereof is controlled to 8% or less, desirably 7% or less, preferably 6% or less, still preferably 5% or less, still further preferably 4% or less. For intending to improve the property of being chemically strengthened characteristics by ion exchange, it is desirable that the content thereof be 3% or more, preferably 4% or more.

MgO is not an essential component, but the glass may have a content of MgO of up to 18% in order to enhance whiteness by increasing ease of acceleration of phase-separation coupled with $SiO_2$ and $Na_2O$. On the contrary, when the content of MgO is too large, the phase-separation is hardly occurred. In order to avoid reduction in whiteness, the content thereof is therefore controlled to 18% or less. In addition, it is desirable that the content thereof be less than 11%, preferably 10% or less, still preferably 9% or less. For intending to further promote whitening, it is desirable that the content thereof be 8% or less. In cases where the glass contains MgO for the purpose of inhibiting devitrification, it is desirable that the content thereof be more than 0.5%, preferably 3% or more, still preferably 5% or more, still further preferably 7% or more. The term devitrification as used herein means a phenomenon in which transparency is lost by precipitation of crystals (in the following, the same as this meaning).

CaO, SrO and BaO are components having the effect of increasing whiteness, and the glass is required to contain any one of them for attainment of high whiteness.

When the glass contains CaO, the content thereof is desirably 1% or more, preferably 2% or more. In order to avoid devitrification, the content thereof is 7% or less, preferably 6% or less, more preferably 5% or less.

When the glass contains SrO, the content thereof is preferably 1% or more, preferably 2% or more. In order to avoid devitrification, the content thereof is 10% or less, desirably 8% or less.

When the glass contains BaO, the content thereof is preferably 1% or more, more preferably 3% or more, still preferably 5% or more. In order to avoid devitrification, the content of BaO is 12% or less, preferably 10% or less, preferably 9% or less. BaO has the greater effect of promoting whitening than the other alkaline-earth metal oxides.

The total content of these components, CaO+SrO+BaO, is from 1% to 22%. In order to attain high whiteness, the total content of these components is 1% or more, preferably 2% or more, preferably 3% or more, still preferably 5% or more. For the purpose of increasing stability and avoiding devitrification, the total content is controlled to 22% or less, preferably 15% or less, more preferably 13% or less, still preferably 12% or less, still further preferably 10% or less.

In order to avoid increasing the melting temperature, or in order to lower melt viscosity, the total content RO of MgO, CaO, SrO and BaO is adjusted to 5% or more, preferably 10% or more, preferably 12% or more. In order to avoid devitrification, the content is controlled to 25% or less, preferably 22% or less, more preferably 20% or less.

In order to avoid devitrification, the ratio CaQ/RO of the content of CaO to the RO is controlled to 0.7 or less, preferably 0.6 or less, more preferably 0.5 or less.

$ZrO_2$ is not an essential component, but the glass may include $ZrO_2$ in an amount of up to 5% in order to obtain an improvement in chemical durability and so on. In order not to cause reduction in whiteness, the content thereof is controlled to 5% or less, preferably 4% or less, more preferably 3% or less. In cases where the glass contains $ZrO_2$ for the purpose of increasing compressive stress by the ion exchange, it is desirable that the content thereof be 0.5% or more.

Because $Na_2O$ has the effect of increasing meltability of glass, the content thereof is adjusted to 5% or more, preferably 8% or more, more preferably 9% or more. In order to retain weather resistance and whiteness, the content of $Na_2O$ is controlled to 15% or less, preferably 14% or less, more preferably 13% or less. For intending to give the whiteness to glass in particular, it is desirable that the content thereof be controlled to 12% or less, preferably 11% or less. For intending to heighten the surface compressive stress through the ion-exchange treatment and to increase the glass strength, it is desirable that the content of $Na_2O$ be 6% or more, preferably 7% or more, still preferably 8% or more, still further preferably 9% or more.

$P_2O_5$ is a basic component that remarkably accelerates whitening of glass, and the content thereof is adjusted to 2% or more. The content thereof is preferably 3% or more, more preferably 4% or more. In order to inhibit sublimation, reduce unevenness in whiteness and enhance the appearance of the glass, the content thereof is controlled to 10% or less, preferably 8% or less, more preferably 7% or less.

In a case where the glass contains CaO, the ratio $CaO/P_2O_5$ of the content of CaO to the content of $P_2O_5$ is preferably 1.5 or less, more preferably 1.2 or less, for the purpose of preventing devitrification.

The glass in the present invention essentially consists of the components recited above, but it may further contain other components so long as the objects of the present invention are not impaired thereby. In such a case, the total content of the components is desirably 9% or less. The total content of 8 components, $SiO_2$, $Al_2O_3$, MgO, $Na_2O$, $P_2O_5$, CaO, SrO and BaO, is desirably 90% or more, typically 94% or more.

Examples of the other components than those recited above include the following ones.

$La_2O_3$ has the effect of enhancing whiteness of the glass, and the content thereof may be 5% or less. In order to prevent the glass from becoming brittle, the content thereof is controlled to 5% or less, preferably 3% or less, more preferably 2% or less.

As a coloring component, the glass may further contain e.g. Co, Mn, Fe, Ni, Cu, Cr, V, Zn, Bi, Er, Tm, Nd, Sm, Sn, Ce, Pr, Eu, Ag or Au. In this case, the total content of these coloring components is typically 5% or less, in terms of mole percentage based on oxides of minimum valence numbers.

In the whitened glass in the present invention, the linear transmittance of light having a wavelength of 600 nm is desirably 2% or less in order to achieve the intended concealing property or shielding property. Such a linear transmittance is preferably 1.5% or less, still preferably 1% or less, still further preferably 0.7% or less, extremely preferably 0.5% or less. For enhancement of the shielding property, it is desirable that the linear transmittances of light having wavelengths of 400 nm, 600 nm and 800 nm be all 20% or less, preferably 10% or less, still preferably 5% or less. The linear transmittance can be determined by usual transmittance measurements (linear transmittance measurements), and the measurements can be made by the method described later in Examples.

(Glass for Building Material)

Examples of a phase-separated glass for building material include a glass for an interior use of a gallery or tunnel. The term "gallery" refers to a passage made underground and used mainly for extracting ores from a mine or the like, and the term "tunnel" refers to a structure which is formed naturally or made artificially by civil engineering works so as to lead from the ground to a place of destination by digging through the underground, the seafloor or a mountain and has a space narrow in the axial direction as compared to the height and width of its cross section.

Examples of an artificial tunnel include a passage dug (e.g., a mountain tunnel) through the underground for bringing tap water or laying lifelines such as electric wires (e.g. a communal ditch) and a traffic route such as a road or railroad (track) constructed by digging e.g. through a mountain for the purpose of extracting ores, storing up or transporting supplies, or so on.

The thickness of the phase-separated glass for a building material is desirably 0.5 mm or more, preferably 1 mm or more, still preferably 2 mm or more, particularly preferably 3 mm or more. By allowing the phase-separated glass to have a thickness of 0.5 mm or more, sufficient strength can be attained. Further, from the viewpoint of achieving light weight, the thickness is desirably 30 mm or less, preferably 20 mm or less, still preferably 15 mm or less, extremely preferably 10 mm or less.

When the glaze layer on the surface of tiles each, which have been used for decorating the interior part of a gallery or a tunnel, begins to scale, the ceramic substrate of each tile becomes bare and tends to get contaminated, and the contaminants adhering thereto resist being removed. In contrast to such a situation, by using the white glass according to the present invention for decorating the interior part of a gallery or a tunnel, even though scratches or chips are made on the glass surface, it becomes possible to defy adhesion of contaminants, to have excellent ability to be cleaned and to maintain reflection performance because the newly exposed surface is glass.

In addition, the phase-separated glass for a building material in the present invention is superior in strength as compared with tiles having glazed ceramic substrates, and the surface thereof resists being scratched and chipped, and even though scratches and chips are made on the glass surface, the strength of the glass can be maintained because the newly exposed surface is glass.

Further, according to the phase-separated glass for a building material in the present invention, when such a glass having excellent processability is used as an interior material for galleries or tunnels, it can be an interior material having designability.

The phase-separated glass for a building material in the present invention can be directly attached to on a wall surface with an adhesive or the like. In addition, a glass panel for a building material formed by attaching two or more white glass plates to a cement plate or a metal plate can also be installed on a wall surface. In addition, instead of directly attaching to a wall surface, it may be fastened to a wall surface by means of a jig made of metal or ceramic. In the case of fastening it by means of a jig, the glass may be held at the ends thereof, or it may be fastened by utilizing a hole made in the plane of white glass.

The phase-separated glass for a building material in the present invention may be laminated to a resin or the like or it may be formed into a laminated glass by using a resin or the like for an intermediate layer between glasses for the purpose of preventing the glass from shattering and scattering at the time of a clash between vehicles or the like. In this case, the glass on the back surface may be a white glass or may be a transparent glass.

The phase-separated glass for a building material in the present invention may be subjected to polishing at its edges for the purpose of increasing handleability or preventing strength reduction due to cracking or the like.

As to the size of the phase-separated glass for a building material in the present invention, the length of the short side or short diameter thereof is desirably 30 mm or more, preferably 40 mm or more, still preferably 100 mm or more, particularly preferably 500 mm or more. By having a short side or short diameter of 30 mm or more, the glass pieces to be installed can be prevented from increasing in number, and working efficiency can be enhanced. The length of the long side or long diameter thereof is desirably 3,000 mm or less, preferably 2,000 mm or less, still preferably 1,000 mm or less. By having a long side or long diameter of 3,000 mm or less, it can be easily handled.

The density of the phase-separated glass for a building material in the present invention is desirably 3.0 g/cm$^3$ or less, preferably 2.8 g/cm$^3$ or less. By controlling the density to 3.0 g/cm$^3$ or less, the light weight can be achieved. The density is typically 2.5 g/cm$^3$ or more, preferably 2.6 g/cm$^3$ or more, still preferably 2.7 g/cm$^3$ or more. Density measurements can be made according to Archimedes's method.

It is appropriate that the phase-separated glass for a building material in the present invention include no filler-mixed glass. When a filler-mixed glass is included, the proportion of filler mixed is desirably controlled to 1% or less. Here, the filler refers to ceramic powder or crystalline powder, and the filler-mixed glass refers to a glass made by mixing filler into a glass and thermoforming the resultant mixture. Crystals precipitated out of homogeneous glass obtained through melting are not included in the meaning of the filler.

Examples of such filler include aluminum nitride, zirconium oxide, zircon and titanium oxide. Bubbles are liable to be incorporated into the filler-mixed glass, and there is a fear that the strength may be lowered by stress resulting from a difference in thermal expansion between the filler and the mother glass. By including no filler-mixed glass, strength of the glass can be enhanced.

Acid resistance (0.1 M HCl treatment at 90° C. for 20 hours) of the phase-separated glass for a building material in the present invention is desirably 2 mg/cm$^2$ or less, preferably 1 mg/cm$^2$ or less, still preferably 0.5 mg/cm$^2$ or less. By controlling the acid resistance (0.1 M HCl treatment at 90° C. for 20 hours) to 2 mg/cm$^2$ or less, the resistance to sulfur oxide (SOx) or nitrogen oxide (NOx) included in exhausted gases can be improved.

Alkali resistance (0.1 M NaOH treatment at 90° C. for 20 hours) of the phase-separated glass for a building material in the present invention is desirably 2 mg/cm$^2$ or less, preferably 1 mg/cm$^2$ or less. By controlling the alkali resistance (0.1 M NaOH treatment at 90° C. for 20 hours) to 2 mg/cm$^2$ or less, the resistance to alkali components eluted from concrete or the like used for the surface of a wall can be improved.

The phase-separated glass for a building material in the present invention desirably has a bending strength of 60 MPa or more, preferably 80 MPa or more. When its bending strength is 60 MPa or more, the phase-separated glass can have strength enough to resist a clash between cars or deformation caused in a wall surface with the lapse of time. The bending strength is determined by three-point bending test.

The phase-separated glass for a building material in the present invention is typically in the shape of a plate. In addition to a flat plate, the glass may be shaped into a curved plate. In this case, the glass shaped into a flat plate, a block or the like is brought into a softened state by reheating, and may be deformed by its own weight or by press forming. Alternatively, the glass may be formed into a desired shape by the so-called direct press method, wherein press forming is carried out by casting molten glass directly into a press mold.

The surface of the phase-separated glass for a building material in the present invention may be flat surface, or may be unevenly patterned. The uneven pattern may be formed by sandwiching the glass in a softened state between rollers the surface of which is in an uneven state or by pressing. Further, the glass surface may be mirror surface, or it may be glassy by grinding with abrasive powder or by etching.

EXAMPLE

In each of Examples 1-1 to 73, glass raw materials were selected as appropriate from generally used glass raw materials such as oxides, hydroxides, carbonates and sulfates so as to have a composition specified by mole percentages in each column of from SiO$_2$ to SrO, as shown in Tables 1 to 11, followed by weighing them so that the weight of 400 g, and mixing them. Then the resulting mixture was put in a platinum crucible, followed by throwing into a resistance heating electric furnace of 1,600° C. and melting for 3 hours, and further subjecting to defoaming and homogenizing. Then the melt was poured into a mold, followed by keeping for 1 hour at a temperature which is shown in the row of T$_A$ in each Table and has a unit of ° C., and cooling to room temperature at a cooling rate of 1° C. per minute Thus, the glass (untreated glass) was obtained in each Example.

In each Table, "Ca+Sr+Ba" is the total content of CaO, SrO and BaO, "CaO/P$_2$O$_5$" is the molar ratio of the content of CaO to the content of P$_2$O$_5$, "CaO/RO" is the molar ratio of the content of CaO to the RO defined hereinbefore, and "SAMCSBNP" is the total content of $SiO_2$, $Al_2O_3$, MgO, CaO, SrO, BaO, $Na_2O$ and $P_2O_5$.

In addition, the glass transition point Tg and the yield point are expressed in units of ° C. The measurement of Tg and yield point were made by using a thermal dilatometer (TMA4000SA, a product of Bruker AXS K.K.) based on JIS R 3103-3:2001. As measurement samples, columnar samples having a diameter of 5 mm and a length of 20 mm were used, and the measurements were made under conditions that the temperature rising rate was 5° C./min and the load was 10 g during the measurements. Tg was determined in accordance with JIS R 1618:2002. The yield point was defined as a temperature at which a temperature differential value of linear expansivity a was zero.

For example, the glass in Example 1-1 and the glass in Example 1-2 were the same in themselves, and the glass in Example 1-1 was an untreated glass, while the glass in Example 1-2 was a glass obtained by subjecting the untreated glass to heat treatment described later. In addition, the glasses in Examples 25, 26 and 31 to 64 were untreated glasses, and the glasses in Examples 4, 21 and 65 to 73 were heat-treated glasses. Examples 1-1 to 20-2 and 31 to 73 are working examples, Examples 22-1 to 30-2 are comparative examples, and Example 21 is also a working example.

Next, these glasses were subjected to heat treatment as required, and then cooled to room temperature. The glasses in Examples indicated by Y in the "heat treatment" row in each of Tables 1 to 10 were glasses having undergone such heat treatment, and those indicated by N in the "heat treatment" row in each of Tables 1 to 10 were untreated glasses not having undergone such heat treatment. Of the glasses in Examples 1-2 to 30-2, glasses indicated by Y in the "heat treatment" row were those having undergone the heat treatment held at 900° C. for 4 hours.

On the other hand, in Examples 65 to 73, the glasses had undergone heat treatment held at their respective temperatures (unit: ° C.) shown in the "heat treatment" row in Table 11 for 30 hours.

As to the heat-treated glasses, heating up to their respective heat treatment temperatures and cooling from their respective heat treatment temperatures were both carried out at a rate of 5° C./min.

The untreated glasses in Examples 1-1 to 3-1, 5-1 to 20-1 and 31 to 64 are working examples in which whitening already occurred in the process of making the glass and low linear transmittances were achieved.

Each of the glasses obtained was observed by SEM, and an assessment of whether phase-separation was present or not was made. Thus, the occurrence of phase-separation was observed in each of Examples 1-20, 22, 23, 25, 26, 28-73, and no occurrence of phase-separation was observed in each of Examples 24-1, 24-2, 27-1 and 27-2. In addition, the occurrence of phase-separation was also observed in Example 21.

Further, an assessment of whether crystals were present or not in each of the glasses obtained was made by means of X-ray diffractometry. Results obtained are shown together in Tables. The crystals precipitated in the process of melting glass tend to become foreign matter defects, and it is therefore preferred that no crystals be precipitated.

On the white glasses obtained, the measurements of the linear transmittance of light having wavelengths of 400 nm, 600 nm and 800 nm, respectively, on condition that each glass was adjusted to have a thickness of 1 mm, which are abbreviated as $T_{400}$, $T_{600}$ and $T_{800}$ (unit: %), were made in the following manner. Specifically, samples having a size of about 20 cm×about 20 cm and a thickness of 1 mm in which top and bottom surfaces had been mirror-finished were prepared. Then, a spectral transmittance curve of each sample over a wavelength region from 400 nm to 800 nm was acquired by means of a Hitachi spectrophotometer U-4100, and the linear transmittances at wavelengths of 400 nm, 600 nm and 800 nm were determined therefrom.

The total light reflectance $R_{600}$ (unit: %) of light having a wavelength of 600 nm was measured on each sample by means of a spectrophotometer (Lamda 950) manufactured by PerkinElmer Inc. The results obtained are shown in Tables. The values of $R_{600}$ in all the working examples were 50% or more, but in the comparative examples, those values of $R_{600}$ were less than 50%, crystals were precipitated, or $T_{600}$ was more than 2%. Additionally, the numeric data marked with "*" are estimated values.

Next, the whitened samples were chemically strengthened by ion-exchange treatment in which each sample was immersed for 6 hours in a molten salt of 100% $KNO_3$ heated to 400° C., and thereafter, values of surface compressive stress CS (unit: MPa) and depth of a compressive stress layer DOL (unit: μm) were measured on the resulting samples each by means of a surface stress meter (FSM-6000, manufactured by Orihara Industrial Co. Ltd.). The results of these measurements are shown in Tables 1 to 11. The white glasses in Examples 3-2, 6-2, 12-1, 12-2, 13-2, 14-2, 16-1, 16-2, 17-2, 18-2, 19-2, 20-1, 20-2, 24-1, 24-2, 25, 26, 27-2, 40 and 41 were impervious to light, and it was therefore impossible to measure their CS and DOL values with the above surface stress meter.

As shown in Tables 1 to 11, it was found that the glasses in the working examples were whitened to have low linear transmittances, and by chemically strengthening the glasses, the glasses having improved strength were obtained.

Additionally, when sand was sandwiched between ABS resin and each of the glasses in Examples 2-1 and 2-2, which are a white glass according to the present invention and a strengthened white glass according to the present invention, respectively, followed by rubbing them, scratches were observed on the ABS resin by visual observation, but no noticeable scratches were observed on these glasses in the working examples of the present invention. In the other glasses in the working examples of the present invention, the similar results were obtained.

TABLE 1

| Example | 1-1 | 1-2 | 2-1 | 2-2 | 3-1 | 3-2 | 4 | 5-1 | 5-2 |
|---|---|---|---|---|---|---|---|---|---|
| $SiO_2$ | 60.7 | 60.7 | 60.7 | 60.7 | 60.7 | 60.7 | 62.7 | 59.7 | 59.7 |
| $Al_2O_3$ | 3.4 | 3.4 | 3.4 | 3.4 | 3.4 | 3.4 | 3.4 | 3.4 | 3.4 |
| $B_2O_3$ | 3.9 | 3.9 | 3.9 | 3.9 | 3.9 | 3.9 | 3.9 | 3.9 | 3.9 |
| MgO | 13.2 | 13.2 | 7.6 | 7.6 | 13.2 | 13.2 | 7.6 | 7.6 | 7.6 |
| CaO | 0 | 0 | 0 | 0 | 2.0 | 2.0 | 0 | 0 | 0 |
| $ZrO_2$ | 2.5 | 2.5 | 2.5 | 2.5 | 2.5 | 2.5 | 2.5 | 2.5 | 2.5 |
| $Na_2O$ | 9.3 | 9.3 | 9.3 | 9.3 | 9.3 | 9.3 | 9.3 | 10.3 | 10.3 |
| $K_2O$ | 0 | 0 | 0 | 0 | 0 | 0 | 0 | 0 | 0 |

TABLE 1-continued

| Example | 1-1 | 1-2 | 2-1 | 2-2 | 3-1 | 3-2 | 4 | 5-1 | 5-2 |
|---|---|---|---|---|---|---|---|---|---|
| $P_2O_5$ | 5.1 | 5.1 | 5.1 | 5.1 | 5.1 | 5.1 | 3.1 | 5.1 | 5.1 |
| BaO | 2.0 | 2.0 | 7.6 | 7.6 | 0 | 0 | 7.6 | 7.6 | 7.6 |
| SrO | 0 | 0 | 0 | 0 | 0 | 0 | 0 | 0 | 0 |
| Ca + Sr + Ba | 2.0 | 2.0 | 7.6 | 7.6 | 2.0 | 2.0 | 7.6 | 7.6 | 7.6 |
| RO | 15.2 | 15.2 | 15.2 | 15.2 | 15.2 | 15.2 | 15.2 | 15.2 | 15.2 |
| $CaO/P_2O_5$ | 0 | 0 | 0 | 0 | 0.40 | 0.40 | 0 | 0 | 0 |
| CaO/RO | 0 | 0 | 0 | 0 | 0.13 | 0.13 | 0 | 0 | 0 |
| SAMCSBNP | 93.5 | 93.5 | 93.5 | 93.5 | 93.5 | 93.5 | 93.5 | 93.5 | 93.5 |
| Tg | 620 | 620 | 603 | 603 | 603 | 603 | 624 | 611 | 611 |
| $T_A$ | 650 | 650 | 633 | 633 | 633 | 633 | 654 | 641 | 641 |
| Yield point | 723 | 723 | 723 | 723 | 677 | 677 | 728 | 719 | 719 |
| Heat treatment | N | Y | N | Y | N | Y | Y | N | Y |
| $T_{800}$ | 9.4 | 8.1 | 1.2 | 0.3 | 6.0 | 2.8 | 33.6 | 0.9 | 0.6 |
| $T_{600}$ | 1.0 | 0.9 | 0.2 | 0.2 | 0.6 | 0.4 | 2.0 | 0.2 | 0.2 |
| $T_{400}$ | 0.3 | 0.3 | 0.2 | 0.1 | 0.3 | 0.3 | 0.4 | 0.2 | 0.2 |
| $R_{600}$ | 61* | 62* | 81 | 81* | 67* | 73* | 52* | 80* | 80* |
| CS/DOL | 648/22 | 644/22 | 599/20 | 599/21 | 663/22 | | 569/21 | 650/21 | 653/28 |
| Presence or absence of crystals | absence | absence | absence | absence | absence | absence | absence | absence | absence |

TABLE 2

| Example | 6-1 | 6-2 | 7-1 | 7-2 | 8-1 | 8-2 | 9-1 | 9-2 | 10-1 | 10-2 |
|---|---|---|---|---|---|---|---|---|---|---|
| $SiO_2$ | 59.7 | 59.7 | 59.7 | 59.7 | 61.7 | 61.7 | 58.7 | 58.7 | 58.7 | 58.7 |
| $Al_2O_3$ | 4.4 | 4.4 | 3.4 | 3.4 | 3.4 | 3.4 | 4.4 | 4.4 | 5.4 | 5.4 |
| $B_2O_3$ | 3.9 | 3.9 | 3.9 | 3.9 | 2.9 | 2.9 | 3.9 | 3.9 | 3.9 | 3.9 |
| MgO | 7.6 | 7.6 | 7.6 | 7.6 | 7.6 | 7.6 | 7.6 | 7.6 | 7.6 | 7.6 |
| CaO | 0 | 0 | 0 | 0 | 0 | 0 | 0 | 0 | 0 | 0 |
| $ZrO_2$ | 2.5 | 2.5 | 3.5 | 3.5 | 2.5 | 2.5 | 2.5 | 2.5 | 2.5 | 2.5 |
| $Na_2O$ | 9.3 | 9.3 | 9.3 | 9.3 | 9.3 | 9.3 | 10.3 | 10.3 | 9.3 | 9.3 |
| $K_2O$ | 0 | 0 | 0 | 0 | 0 | 0 | 0 | 0 | 0 | 0 |
| $P_2O_5$ | 5.1 | 5.1 | 5.1 | 5.1 | 5.1 | 5.1 | 5.1 | 5.1 | 5.1 | 5.1 |
| BaO | 7.6 | 7.6 | 7.6 | 7.6 | 7.6 | 7.6 | 7.6 | 7.6 | 7.6 | 7.6 |
| SrO | 0 | 0 | 0 | 0 | 0 | 0 | 0 | 0 | 0 | 0 |
| Ca + Sr + Ba | 7.6 | 7.6 | 7.6 | 7.6 | 7.6 | 7.6 | 7.6 | 7.6 | 7.6 | 7.6 |
| RO | 15.2 | 15.2 | 15.2 | 15.2 | 15.2 | 15.2 | 15.2 | 15.2 | 15.2 | 15.2 |
| $CaO/P_2O_5$ | 0 | 0 | 0 | 0 | 0 | 0 | 0 | 0 | 0 | 0 |
| CaO/RO | 0 | 0 | 0 | 0 | 0 | 0 | 0 | 0 | 0 | 0 |
| SAMCSBNP | 93.5 | 93.5 | 92.5 | 92.5 | 94.5 | 94.5 | 93.5 | 93.5 | 93.5 | 93.5 |
| Tg | 619 | 619 | 629 | 629 | 623 | 623 | 617 | 617 | 625 | 625 |
| $T_A$ | 649 | 649 | 659 | 659 | 653 | 653 | 647 | 647 | 655 | 655 |
| Yield point | 738 | 738 | 722 | 722 | 745 | 745 | 717 | 717 | 748 | 748 |
| Heat treatment | N | Y | N | Y | N | Y | N | Y | N | Y |
| $T_{800}$ | 0.7 | 1.1 | 2.1 | 0.8 | 0.5 | 0.9 | 4.4 | 1.0 | 2.6 | 1.4 |
| $T_{600}$ | 0.2 | 0.2 | 0.2 | 0.2 | 0.2 | 0.2 | 0.2 | 0.2 | 0.2 | 0.2 |
| $T_{400}$ | 0.1 | 0.1 | 0.2 | 0.2 | 0.1 | 0.1 | 0.2 | 0.2 | 0.2 | 0.2 |
| $R_{600}$ | 82* | 82* | 80* | 80* | 81* | 82* | 79* | 80* | 81* | 81* |
| CS/DOL | 644/26 | | 662/17 | 661/17 | 617/20 | 617/20 | 691/22 | 677/23 | 667/23 | 650/24 |
| Presence or absence of crystals | absence | absence | absence | absence | absence | absence | absence | absence | absence | absence |

TABLE 3

| Example | 11-1 | 11-2 | 12-1 | 12-2 | 13-1 | 13-2 | 14-1 | 14-2 | 15-1 | 15-2 |
|---|---|---|---|---|---|---|---|---|---|---|
| $SiO_2$ | 59.7 | 59.7 | 57.7 | 57.7 | 56.7 | 56.7 | 57.2 | 57.2 | 57.7 | 57.7 |
| $Al_2O_3$ | 4.4 | 4.4 | 5.4 | 5.4 | 6.4 | 6.4 | 5.4 | 5.4 | 5.4 | 5.4 |
| $B_2O_3$ | 2.9 | 2.9 | 3.9 | 3.9 | 3.9 | 3.9 | 3.9 | 3.9 | 3.9 | 3.9 |
| MgO | 7.6 | 7.6 | 7.6 | 7.6 | 7.6 | 7.6 | 7.6 | 7.6 | 8.6 | 8.6 |
| CaO | 0 | 0 | 0 | 0 | 0 | 0 | 0 | 0 | 0 | 0 |
| $ZrO_2$ | 2.5 | 2.5 | 2.5 | 2.5 | 2.5 | 2.5 | 3.0 | 3.0 | 2.5 | 2.5 |
| $Na_2O$ | 10.3 | 10.3 | 9.3 | 9.3 | 9.3 | 9.3 | 9.3 | 9.3 | 9.3 | 9.3 |
| $K_2O$ | 0 | 0 | 0 | 0 | 0 | 0 | 0 | 0 | 0 | 0 |
| $P_2O_5$ | 5.1 | 5.1 | 6.1 | 6.1 | 6.1 | 6.1 | 6.1 | 6.1 | 6.1 | 6.1 |
| BaO | 7.6 | 7.6 | 7.6 | 7.6 | 7.6 | 7.6 | 7.6 | 7.6 | 6.6 | 6.6 |
| SrO | 0 | 0 | 0 | 0 | 0 | 0 | 0 | 0 | 0 | 0 |
| Ca + Sr + Ba | 7.6 | 7.6 | 7.6 | 7.6 | 7.6 | 7.6 | 7.6 | 7.6 | 6.6 | 6.6 |
| RO | 15.2 | 15.2 | 15.2 | 15.2 | 15.2 | 15.2 | 15.2 | 15.2 | 15.2 | 15.2 |

TABLE 3-continued

| Example | 11-1 | 11-2 | 12-1 | 12-2 | 13-1 | 13-2 | 14-1 | 14-2 | 15-1 | 15-2 |
|---|---|---|---|---|---|---|---|---|---|---|
| $CaO/P_2O_5$ | 0 | 0 | 0 | 0 | 0 | 0 | 0 | 0 | 0 | 0 |
| CaO/RO | 0 | 0 | 0 | 0 | 0 | 0 | 0 | 0 | 0 | 0 |
| SAMCSBNP | 94.5 | 94.5 | 93.5 | 93.5 | 93.5 | 93.5 | 93.0 | 93.0 | 93.5 | 93.5 |
| Tg | 623 | 623 | 625 | 625 | 639 | 639 | 641 | 641 | 629 | 629 |
| $T_A$ | 653 | 653 | 655 | 655 | 669 | 669 | 671 | 671 | 659 | 659 |
| Yield point | 734 | 734 | 723 | 723 | 767 | 767 | 764 | 764 | 747 | 747 |
| Heat treatment | N | Y | N | Y | N | Y | N | Y | N | Y |
| $T_{800}$ | 8.6 | | 0.2 | 0.2 | 6.0 | 0.3 | 1.5 | 0.2 | 0.3 | 0.3 |
| $T_{600}$ | 0.2 | | 0.2 | 0.2 | 0.2 | 0.2 | 0.2 | 0.2 | 0.2 | 0.2 |
| $T_{400}$ | 0.2 | | 0.1 | 0.1 | 0.1 | 0.1 | 0.1 | 0.1 | 0.1 | 0.1 |
| $R_{600}$ | 77* | 103* | 85* | 85* | 86 | 86* | 84 | 85 | 83 | 83 |
| CS/DOL | 680/23 | 680/24 | | | 619/32 | | 623/28 | | 585/31 | 573/33 |
| Presence or absence of crystals | absence | absence | absence | absence | absence | absence | absence | absence | absence | absence |

TABLE 4

| Example | 16-1 | 16-2 | 17-1 | 17-2 | 18-1 | 18-2 | 19-1 | 19-2 | 20-1 | 20-2 |
|---|---|---|---|---|---|---|---|---|---|---|
| $SiO_2$ | 59.4 | 59.4 | 60.7 | 60.7 | 54.9 | 54.9 | 60.7 | 60.7 | 60.8 | 60.8 |
| $Al_2O_3$ | 3.3 | 3.3 | 3.4 | 3.4 | 3.4 | 3.4 | 3.4 | 3.4 | 3.4 | 3.4 |
| $B_2O_3$ | 0 | 0 | 3.9 | 3.9 | 4.9 | 4.9 | 3.9 | 3.9 | 3.9 | 3.9 |
| MgO | 7.4 | 7.4 | 5.6 | 5.6 | 10.8 | 10.8 | 7.6 | 7.6 | 3.0 | 3.0 |
| CaO | 0 | 0 | 0 | 0 | 3.0 | 3.0 | 0 | 0 | 6.0 | 6.0 |
| $ZrO_2$ | 2.5 | 2.5 | 2.5 | 2.5 | 1.0 | 1.0 | 2.5 | 2.5 | 2.5 | 2.5 |
| $Na_2O$ | 12.0 | 12.0 | 9.3 | 9.3 | 8.1 | 8.1 | 9.3 | 9.3 | 9.3 | 9.3 |
| $K_2O$ | 0 | 0 | 0 | 0 | 2.0 | 2.0 | 0 | 0 | 0 | 0 |
| $P_2O_5$ | 7.9 | 7.9 | 5.1 | 5.1 | 5.1 | 5.1 | 5.1 | 5.1 | 5.1 | 5.1 |
| BaO | 7.4 | 7.4 | 9.6 | 9.6 | 4.9 | 4.9 | 0 | 0 | 6.0 | 6.0 |
| SrO | 0 | 0 | 0 | 0 | 2.0 | 2.0 | 7.6 | 7.6 | 0 | 0 |
| Ca + Sr + Ba | 7.4 | 7.4 | 9.6 | 9.6 | 9.9 | 9.9 | 7.6 | 7.6 | 12.0 | 12.0 |
| RO | 14.8 | 14.8 | 15.2 | 15.2 | 20.7 | 20.7 | 15.2 | 15.2 | 15.0 | 15.0 |
| $CaO/P_2O_5$ | 0 | 0 | 0 | 0 | 0.59 | 0.59 | 0 | 0 | 1.19 | 1.19 |
| CaO/RO | 0 | 0 | 0 | 0 | 0.15 | 0.15 | 0 | 0 | 0.40 | 0.40 |
| SAMCSBNP | 97.5 | 97.5 | 93.5 | 93.5 | 92.1 | 92.1 | 93.5 | 93.5 | 93.5 | 93.5 |
| Tg | 605* | 605* | 610* | 610* | 590* | 590* | 613* | 613* | 616* | 616* |
| $T_A$ | 635 | 635 | 640 | 640 | 620 | 620 | 643 | 643 | 646 | 646 |
| Yield point | 717* | 717* | 692* | 692* | 672* | 672* | 695* | 695* | 698* | 698* |
| Heat treatment | N | Y | N | Y | N | Y | N | Y | N | Y |
| $T_{800}$ | 0.1 | 0.2 | 0.3 | 0.6 | 0.5 | 0.3 | 0.4 | 0.3 | 0.3 | 0.3 |
| $T_{600}$ | 0.1 | 0.1 | 0.2 | 0.2 | 0.2 | 0.2 | 0.2 | 0.2 | 0.2 | 0.2 |
| $T_{400}$ | 0 | 0.1 | 0.1 | 0.1 | 0.2 | 0.2 | 0.2 | 0.2 | 0.2 | 0.2 |
| $R_{600}$ | 96 | 92 | 83 | 83 | 80 | 80 | 77 | 77 | 80 | 79 |
| CS/DOL | | | 609/18 | | 544/20 | | 582/16 | | | |
| Presence or absence of crystals | absence | absence | absence | absence | absence | absence | absence | absence | absence | absence |

TABLE 5

| Example | 21 | 22-1 | 22-2 | 23-1 | 23-2 | 24-1 | 24-2 | 25 | 26 |
|---|---|---|---|---|---|---|---|---|---|
| $SiO_2$ | 68 | 61.5 | 61.5 | 56.8 | 56.8 | 64.7 | 64.7 | 60.7 | 60.7 |
| $Al_2O_3$ | 2.4 | 3.4 | 3.4 | 5.0 | 5.0 | 3.4 | 3.4 | 3.4 | 3.4 |
| $B_2O_3$ | 2.8 | 0 | 0 | 3.9 | 3.9 | 3.9 | 3.9 | 3.9 | 3.9 |
| MgO | 5.5 | 15.4 | 15.4 | 14.9 | 14.9 | 7.6 | 7.6 | 0 | 0 |
| CaO | 0 | 0 | 0 | 0 | 0 | 0 | 0 | 0 | 15.2 |
| $ZrO_2$ | 1.5 | 4.3 | 4.3 | 2.5 | 2.5 | 2.5 | 2.5 | 2.5 | 2.5 |
| $Na_2O$ | 9.3 | 10.3 | 10.3 | 11.1 | 11.1 | 9.3 | 9.3 | 9.3 | 9.3 |
| $K_2O$ | 0 | 0 | 0 | 0 | 0 | 0 | 0 | 0 | 0 |
| $P_2O_5$ | 4.5 | 5.1 | 5.1 | 5.9 | 5.9 | 1.1 | 1.1 | 5.1 | 5.1 |
| BaO | 6.0 | 0 | 0 | 0 | 0 | 7.6 | 7.6 | 15.2 | 0 |
| SrO | 0 | 0 | 0 | 0 | 0 | 0 | 0 | 0 | 0 |
| Ca + Sr + Ba | 6.0 | 0 | 0 | 0 | 0 | 7.6 | 7.6 | 15.2 | 15.2 |
| RO | 11.5 | 15.4 | 15.4 | 14.9 | 14.9 | 15.2 | 15.2 | 15.2 | 15.2 |
| $CaO/P_2O_5$ | 0 | 0 | 0 | 0 | 0 | 0 | 0 | 0 | 3.0 |
| CaO/RO | 0 | 0 | 0 | 0 | 0 | 0 | 0 | 0 | 1.0 |
| SAMCSBNP | 95.7 | 95.7 | 95.7 | 93.6 | 93.6 | 93.5 | 93.5 | 93.5 | 93.5 |
| Tg | 556* | 667 | 667 | 607 | 607 | 641 | 641 | 617 | 627 |
| $T_A$ | 586* | 667 | 667 | 637 | 637 | 671 | 671 | 647 | 657 |

TABLE 5-continued

| Example | 21 | 22-1 | 22-2 | 23-1 | 23-2 | 24-1 | 24-2 | 25 | 26 |
|---|---|---|---|---|---|---|---|---|---|
| Yield point | 638* | 749* | 749* | 854 | 854 | 749 | 749 | 708 | 699 |
| Heat treatment | Y | N | Y | N | Y | N | Y | N | N |
| $T_{800}$ | 0.8* | 77.9 | 78.8 | 26.7 | 24.4 | 91.7 | 92.0 | 0.2 | 0.4 |
| $T_{600}$ | 0.2* | 47.6 | 48.3 | 6.9 | 6.1 | 91.5 | 91.8 | 0.2 | 0.3 |
| $T_{400}$ | 0.2* | 14.5 | 15.4 | 0.4 | 0.4 | 91.0 | 91.3 | 0.1 | 0.3 |
| $R_{600}$ | 82* | 11 | 16 | 34 | 40 | 4* | 4* | 86* | 76* |
| CS/DOL | 530*/16* | 851/24 | 833/24 | 745/30 | 731/31 | | | | |
| Presence or absence of crystals | absence | absence | absence | absence | absence | absence | absence | presence | presence |

TABLE 6

| Example | 27-1 | 27-2 | 28-1 | 28-2 | 29-1 | 29-2 | 30-1 | 30-2 |
|---|---|---|---|---|---|---|---|---|
| $SiO_2$ | 65.7 | 65.7 | 60.7 | 60.7 | 60.7 | 60.7 | 60.7 | 60.7 |
| $Al_2O_3$ | 3.4 | 3.4 | 4.4 | 4.4 | 4.9 | 4.9 | 3.4 | 3.4 |
| $B_2O_3$ | 3.9 | 3.9 | 3.9 | 3.9 | 3.9 | 3.9 | 3.9 | 3.9 |
| MgO | 15.2 | 15.2 | 15.2 | 15.2 | 15.2 | 15.2 | 15.2 | 15.2 |
| CaO | 0 | 0 | 0 | 0 | 0 | 0 | 0 | 0 |
| $ZrO_2$ | 2.5 | 2.5 | 0.5 | 0.5 | 0 | 0 | 2.5 | 2.5 |
| $Na_2O$ | 9.3 | 9.3 | 10.3 | 10.3 | 10.3 | 10.3 | 9.3 | 9.3 |
| $K_2O$ | 0 | 0 | 0 | 0 | 0 | 0 | 0 | 0 |
| $P_2O_5$ | 0 | 0 | 5.1 | 5.1 | 5.1 | 5.1 | 5.1 | 5.1 |
| BaO | 0 | 0 | 0 | 0 | 0 | 0 | 0 | 0 |
| SrO | 0 | 0 | 0 | 0 | 0 | 0 | 0 | 0 |
| Ca + Sr + Ba | 0 | 0 | 0 | 0 | 0 | 0 | 0 | 0 |
| RO | 15.2 | 15.2 | 15.2 | 15.2 | 15.2 | 15.2 | 15.2 | 15.2 |
| $CaO/P_2O_5$ | 0 | 0 | 0 | 0 | 0 | 0 | 0 | 0 |
| CaO/RO | 0 | 0 | 0 | 0 | 0 | 0 | 0 | 0 |
| SAMCSBNP | 93.5 | 93.5 | 95.5 | 95.5 | 96.1 | 96.1 | 93.5 | 93.5 |
| Tg | 642 | 642 | 596 | 596 | 583 | 583 | 614 | 614 |
| $T_4$ | 672 | 672 | 626 | 626 | 613 | 613 | 644 | 644 |
| Yield point | 712 | 712 | 705 | 705 | 698 | 698 | 738 | 738 |
| Heat treatment | N | Y | N | Y | N | Y | N | Y |
| $T_{800}$ | 91.7 | 91.3 | 15.8 | 15.4 | 20.5 | 17.0 | 20.4 | 18.1 |
| $T_{600}$ | 91.6 | 91.3 | 2.4 | 2.3 | 3.9 | 3.0 | 4.3 | 3.5 |
| $T_{400}$ | 91.2 | 90.9 | 0.3 | 0.3 | 0.4 | 0.4 | 0.4 | 0.4 |
| $R_{600}$ | 4* | 4* | 50* | 51* | 44* | 47* | 43* | 45* |
| CS/DOL | 878/9 | | 609/30 | 574/33 | 605/28 | 592/30 | 652/22 | 644/24 |
| Presence or absence of crystals | absence | absence | absence | absence | absence | absence | absence | absence |

TABLE 7

| Example | 31 | 32 | 33 | 34 | 35 | 36 | 37 | 38 | 39 |
|---|---|---|---|---|---|---|---|---|---|
| $SiO_2$ | 62.7 | 61.7 | 60.7 | 60.7 | 60.7 | 60.7 | 60.7 | 60.7 | 59.7 |
| $Al_2O_3$ | 3.4 | 3.4 | 3.4 | 3.4 | 3.4 | 3.4 | 3.4 | 3.4 | 3.4 |
| $B_2O_3$ | 3.9 | 3.9 | 3.9 | 3.9 | 3.9 | 3.9 | 3.9 | 3.9 | 3.9 |
| MgO | 5.6 | 7.6 | 3.6 | 5.6 | 6.6 | 5.6 | 7.1 | 0 | 0 |
| CaO | 0 | 0 | 0 | 0 | 0 | 0 | 0 | 0 | 0 |
| $ZrO_2$ | 2.5 | 2.5 | 2.5 | 2.5 | 2.5 | 2.5 | 2.5 | 2.5 | 2.5 |
| $Na_2O$ | 9.3 | 9.3 | 9.3 | 11.3 | 9.3 | 9.3 | 9.3 | 9.3 | 9.3 |
| $K_2O$ | 0 | 0 | 0 | 0 | 0 | 0 | 0 | 0 | 0 |
| $P_2O_5$ | 5.1 | 4.1 | 5.1 | 5.1 | 5.1 | 5.1 | 5.1 | 5.1 | 5.1 |
| BaO | 7.6 | 7.6 | 11.6 | 7.6 | 7.6 | 7.6 | 7.6 | 7.6 | 7.6 |
| SrO | 0 | 0 | 0 | 0 | 0 | 0 | 0 | 7.6 | 7.6 |
| Ca + Sr + Ba | 7.6 | 7.6 | 11.6 | 7.6 | 7.6 | 7.6 | 7.6 | 15.2 | 15.2 |
| RO | 13.2 | 15.2 | 15.2 | 13.2 | 14.2 | 13.2 | 14.7 | 15.2 | 15.2 |
| $CaO/P_2O_5$ | 0 | 0 | 0 | 0 | 0 | 0 | 0 | 0 | 0 |
| CaO/RO | 0 | 0 | 0 | 0 | 0 | 0 | 0 | 0 | 0 |
| SAMCSBNP | 93.5 | 93.5 | 93.5 | 93.5 | 92.5 | 91.5 | 93.0 | 93.5 | 92.5 |
| Tg | 619 | 613 | 635 | 617 | 621 | 620 | 617 | 637 | 618 |
| $T_4$ | 649 | 643 | 665 | 647 | 651 | 650 | 647 | 667 | 648 |
| Yield point | 733 | 725 | 722 | 687 | 704 | 721 | 694 | 707 | 717 |
| Heat treatment | N | N | N | N | N | N | N | N | N |
| $T_{800}$ | 0.3 | 20.4 | 0.3 | 0.7 | 0.2 | 0.2 | 0.3 | 0.2 | 0.2 |
| $T_{600}$ | 0.2 | 0.5 | 0.2 | 0.2 | 0.2 | 0.1 | 0.2 | 0.2 | 0.2 |
| $T_{400}$ | 0.1 | 0.2 | 0.1 | 0.1 | 0.1 | 0.1 | 0.1 | 0.1 | 0.1 |

TABLE 7-continued

| Example | 31 | 32 | 33 | 34 | 35 | 36 | 37 | 38 | 39 |
|---|---|---|---|---|---|---|---|---|---|
| $R_{600}$ | 83* | 70* | 83* | 81* | 86 | 89 | 82* | 82 | 83 |
| CS/DOL | 591/20 | 636/14 | 525/25 | 638/18 | 601/15 | 605/13 | 616/19 | 661/13 | 575/10 |
| Presence or absence of crystals | absence | absence | absence | absence | absence | absence | absence | absence | absence |

TABLE 8

| Example | 40 | 41 | 42 | 43 | 44 | 45 | 46 | 47 | 48 |
|---|---|---|---|---|---|---|---|---|---|
| $SiO_2$ | 49.5 | 55.6 | 60.7 | 62.7 | 60.6 | 60.6 | 63.6 | 66.0 | 65.0 |
| $Al_2O_3$ | 3.4 | 3.4 | 3.4 | 3.4 | 5.4 | 7.4 | 7.4 | 8.0 | 8.0 |
| $B_2O_3$ | 3.9 | 3.9 | 3.9 | 3.9 | 3.9 | 3.9 | 3.9 | 2.0 | 3.0 |
| MgO | 0 | 10.1 | 7.6 | 7.6 | 6.6 | 5.6 | 4.6 | 0 | 1.0 |
| CaO | 0 | 0 | 0 | 0 | 0 | 0 | 0 | 0 | 0 |
| $ZrO_2$ | 2.5 | 2.5 | 2.5 | 1.5 | 2.5 | 2.5 | 0 | 0 | 0 |
| $Na_2O$ | 12.4 | 9.3 | 8.3 | 9.3 | 9.3 | 9.3 | 11.8 | 13.0 | 13.0 |
| $K_2O$ | 0 | 0 | 1.0 | 0 | 0 | 0 | 0 | 0 | 0 |
| $P_2O_5$ | 7.1 | 5.1 | 5.1 | 4.1 | 5.1 | 5.1 | 4.1 | 5.0 | 5.0 |
| BaO | 10.1 | 10.1 | 7.6 | 7.6 | 6.6 | 5.6 | 4.6 | 6.0 | 5.0 |
| SrO | 10.1 | 0 | 0 | 0 | 0 | 0 | 0 | 0 | 0 |
| Ca + Sr + Ba | 20.2 | 10.1 | 7.6 | 7.6 | 6.6 | 5.6 | 4.6 | 6.0 | 5.0 |
| RO | 20.2 | 20.2 | 15.2 | 15.2 | 13.2 | 11.2 | 9.2 | 6.0 | 6.0 |
| $CaO/P_2O_5$ | 0 | 0 | 0 | 0 | 0 | 0 | 0 | 0 | 0 |
| CaO/RO | 0 | 0 | 0 | 0 | 0 | 0 | 0 | 0 | 0 |
| SAMCSBNP | 92.5 | 93.5 | 92.5 | 94.5 | 93.6 | 93.6 | 96.1 | 98.0 | 97.0 |
| Tg | 608 | 610 | 620 | 599 | 641 | 656 | 620 | 643 | |
| $T_A$ | 638 | 640 | 650 | 629 | 671 | 686 | 650 | 673 | |
| Yield point | 704 | 704 | 736 | 708 | 734 | 781 | 740 | 775 | 744 |
| Heat treatment | N | N | N | N | N | N | N | N | N |
| $T_{800}$ | 0.4 | 13.5 | 0.3 | 4.6 | 3.9 | 50.2 | 22.5 | 11.4 | 28.2 |
| $T_{600}$ | 0.3 | 0.4 | 0.2 | 0.2 | 0.2 | 2.1 | 0.6 | 0.3 | 0.9 |
| $T_{400}$ | 0.2 | 0.2 | 0.1 | 0.2 | 0.1 | 0.1 | 0.1 | 0.1 | 0.1 |
| $R_{600}$ | 76 | 76 | 82 | 79* | 83* | 52* | 67* | 76* | 63* |
| CS/DOL | | | 563/23 | 594/23 | 611/30 | 638/37 | 608/39 | 554/67 | 516/69 |
| Presence or absence of crystals | absence | absence | absence | absence | absence | absence | absence | presence | presence |

TABLE 9

| Example | 49 | 50 | 51 | 52 | 53 | 54 | 55 | 56 |
|---|---|---|---|---|---|---|---|---|
| $SiO_2$ | 64.0 | 61.0 | 61.4 | 60.0 | 60.1 | 61.0 | 62.0 | 62.0 |
| $Al_2O_3$ | 8.0 | 8.0 | 7.5 | 7.0 | 6.5 | 7.0 | 8.0 | 8.0 |
| $B_2O_3$ | 4.0 | 3.0 | 3.0 | 3.0 | 3.0 | 3.0 | 3.0 | 3.0 |
| MgO | 1.0 | 6.0 | 5.5 | 7.0 | 6.0 | 6.0 | 6.0 | 5.0 |
| CaO | 0 | 0 | 0 | 0 | 0 | 0 | 0 | 0 |
| $ZrO_2$ | 0 | 0 | 0 | 0 | 1.0 | 1.0 | 0 | 0 |
| $Na_2O$ | 13.0 | 11.0 | 12.0 | 11.0 | 12.0 | 11.0 | 12.0 | 12.0 |
| $K_2O$ | 0 | 0 | 0 | 0 | 0 | 0 | 0 | 0 |
| $P_2O_5$ | 5.0 | 5.0 | 5.1 | 5.0 | 5.4 | 5.0 | 5.0 | 5.0 |
| BaO | 5.0 | 6.0 | 5.5 | 7.0 | 6.0 | 6.0 | 4.0 | 5.0 |
| SrO | 0 | 0 | 0 | 0 | 0 | 0 | 0 | 0 |
| Ca + Sr + Ba | 5.0 | 6.0 | 5.5 | 7.0 | 6.0 | 6.0 | 4.0 | 5.0 |
| RO | 6.0 | 12.0 | 11.0 | 14.0 | 12.0 | 12.0 | 10.0 | 10.0 |
| $CaO/P_2O_5$ | 0 | 0 | 0 | 0 | 0 | 0 | 0 | 0 |
| CaO/RO | 0 | 0 | 0 | 0 | 0 | 0 | 0 | 0 |
| SAMCSBNP | 96.0 | 97.0 | 97.0 | 97.0 | 96.0 | 96.0 | 97.0 | 97.0 |
| Tg | 618 | 612 | 628 | 608 | | 631 | 628 | 635 |
| $T_A$ | 648 | 642 | 658 | 638 | | 661 | 658 | 665 |
| Yield point | 720 | 745 | 705 | 723 | 745 | 752 | 716 | 749 |
| Heat treatment | N | N | N | N | N | N | N | N |
| $T_{800}$ | 21.6 | 5.8 | 7.4 | 1.5 | 2.8 | 6.3 | 31.8 | 13.0 |
| $T_{600}$ | 0.6 | 0.2 | 0.2 | 0.2 | 0.2 | 0.2 | 1.7 | 0.4 |
| $T_{400}$ | 0.2 | 0.1 | 0.1 | 0.1 | 0.1 | 0.2 | 0.2 | 0.2 |
| $R_{600}$ | 60* | 80* | 77* | 84* | 81* | 79* | 54* | 73* |
| CS/DOL | 502/61 | 620/46 | 599/44 | 592/39 | 613/37 | 659/40 | 634/49 | 617/49 |
| Presence or absence of crystals | presence | presence | presence | presence | presence | absence | absence | presence |

TABLE 10

| Example | 57 | 58 | 59 | 60 | 61 | 62 | 63 | 64 |
|---|---|---|---|---|---|---|---|---|
| $SiO_2$ | 63.2 | 61.4 | 60.2 | 60.6 | 61.1 | 62.3 | 60.9 | 61.7 |
| $Al_2O_3$ | 8.0 | 6.0 | 6.0 | 6.0 | 6.0 | 6.0 | 7.0 | 6.0 |
| $B_2O_3$ | 3.0 | 4.0 | 4.0 | 4.0 | 4.0 | 4.0 | 4.0 | 4.0 |
| MgO | 4.5 | 7.0 | 8.0 | 8.0 | 8.0 | 7.0 | 6.0 | 7.0 |
| CaO | 0 | 0 | 0 | 0 | 0 | 0 | 0 | 0 |
| $ZrO_2$ | 0 | 0 | 0 | 0 | 0 | 0 | 0 | 0 |
| $Na_2O$ | 12.0 | 10.0 | 10.0 | 10.5 | 11.0 | 11.0 | 11.0 | 11.0 |
| $K_2O$ | 0 | 0 | 0 | 0 | 0 | 0 | 0 | 0 |
| $P_2O_5$ | 4.8 | 4.6 | 4.8 | 4.9 | 4.9 | 4.7 | 5.1 | 4.8 |
| BaO | 4.5 | 7.0 | 7.0 | 6.0 | 5.0 | 5.0 | 6.0 | 5.5 |
| SrO | 0 | 0 | 0 | 0 | 0 | 0 | 0 | 0 |
| Ca + Sr + Ba | 4.5 | 7.0 | 7.0 | 6.0 | 5.0 | 5.0 | 6.0 | 5.5 |
| RO | 9.0 | 14.0 | 15.0 | 14.0 | 13.0 | 12.0 | 12.0 | 12.5 |
| $CaO/P_2O_5$ | 0 | 0 | 0 | 0 | 0 | 0 | 0 | 0 |
| CaO/RO | 0 | 0 | 0 | 0 | 0 | 0 | 0 | 0 |
| SAMCSBNP | 97.0 | 96.0 | 96.0 | 96.0 | 96.0 | 96.0 | 96.0 | 96.0 |
| Tg | 635 | 603 | 602 | 602 | 603 | 608 | 613 | 605 |
| $T_A$ | 665 | 633 | 632 | 632 | 633 | 638 | 643 | 635 |
| Yield point | 761 | 710 | 710 | 715 | 706 | 715 | 719 | 702 |
| Heat treatment | N | N | N | N | N | N | N | N |
| $T_{800}$ | 21.8 | 0.6 | 0.4 | 0.7 | 2.1 | 2.8 | 1.5 | 2.0 |
| $T_{600}$ | 0.8 | 0.2 | 0.2 | 0.2 | 0.2 | 0.3 | 0.2 | 0.2 |
| $T_{400}$ | 0.2 | 0.1 | 0.1 | 0.1 | 0.2 | 0.2 | 0.1 | 0.2 |
| $R_{600}$ | 65* | 85* | 84* | 82* | 77* | 76* | 81* | 78* |
| CS/DOL | 602/51 | 552/29 | 558/29 | 572/31 | 582/32 | 572/32 | 573/39 | 566/32 |
| Presence or absence of crystals | presence | absence | absence | absence | absence | absence | absence | absence |

TABLE 11

| Example | 65 | 66 | 67 | 68 | 69 | 70 | 71 | 72 | 73 |
|---|---|---|---|---|---|---|---|---|---|
| $SiO_2$ | 65.2 | 72.2 | 61.5 | 62.3 | 62.5 | 63.0 | 64.0 | 65.0 | 64.8 |
| $Al_2O_3$ | 4.0 | 1.1 | 4.0 | 4.0 | 4.0 | 4.0 | 3.0 | 3.0 | 3.0 |
| $B_2O_3$ | 2.0 | 0 | 5.0 | 5.0 | 5.0 | 5.0 | 5.0 | 5.0 | 5.0 |
| MgO | 10.0 | 5.5 | 13.0 | 12.0 | 11.0 | 11.0 | 12.0 | 12.0 | 12.0 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 11.0 | 12.6 | 8.0 | 8.0 | 9.0 | 9.0 | 9.0 | 9.0 | 9.0 |
| $K_2O$ | 0 | 0.0 | 0 | 0 | 0 | 0 | 0 | 0 | 0 |
| $P_2O_5$ | 3.8 | 3.6 | 3.5 | 3.7 | 3.5 | 4.0 | 4.0 | 3.0 | 3.2 |
| BaO | 4.0 | 5.0 | 5.0 | 5.0 | 5.0 | 4.0 | 3.0 | 3.0 | 3.0 |
| SrO | 0 | 0.0 | 0 | 0 | 0 | 0 | 0 | 0 | 0 |
| Ca + Sr + Ba | 4.0 | 5.0 | 5.0 | 5.0 | 5.0 | 4.0 | 3.0 | 3.0 | 3.0 |
| RO | 14.0 | 10.5 | 18.0 | 17.0 | 16.0 | 15.0 | 15.0 | 15.0 | 15.0 |
| $CaO/P_2O_5$ | 0 | 0 | 0 | 0 | 0 | 0 | 0 | 0 | 0 |
| CaO/RO | 0 | 0 | 0 | 0 | 0 | 0 | 0 | 0 | 0 |
| SAMCSBNP | 98.0 | 100.0 | 95.0 | 95.0 | 95.0 | 95.0 | 95.0 | 95.0 | 95.0 |
| Tg | 586 | 513 | 598 | 599 | 597 | 587 | 579 | 583 | 585 |
| $T_A$ | 616 | 543 | 628 | 629 | 627 | 617 | 609 | 613 | 615 |
| Yield point | 689 | 643 | 692 | 695 | 689 | 695 | 696 | 680 | 680 |
| Heat treatment | 1,300 | 1,250 | 1,270 | 1,290 | 1,270 | 1,300 | 1,300 | 1,280 | 1,290 |
| $T_{800}$ | 0.4 | 1.4 | 0.4 | 0.4 | 0.4 | 0.4 | 0.4 | 0.4 | 0.7 |
| $T_{600}$ | 0.3 | 0.2 | 0.3 | 0.3 | 0.3 | 0.3 | 0.4 | 0.4 | 0.3 |
| $T_{400}$ | 0.2 | 0.1 | 0.2 | 0.2 | 0.2 | 0.3 | 0.3 | 0.3 | 0.3 |
| $R_{600}$ | 67 | 80 | 70 | 68 | 69 | 64 | 61 | 63 | 64 |
| CS/DOL | 584/26 | 255/33 | 519/15 | 502/17 | 548/16 | 537/19 | 518/17 | 554/14 | 565/14 |
| Presence or absence of crystals | presence | presence | absence | absence | absence | absence | absence | absence | absence |

While the present invention has been described in detail and with reference to specific embodiments thereof, it will be apparent to one skilled in the art that various changes and modifications can be made therein without departing from the spirit and scope of the present invention.

This application is based on Japanese Patent Application No. 2013-014589 filed on Jan. 29, 2013, the entire contents of which are incorporated herein by reference.

INDUSTRIAL APPLICABILITY

The white glass according to the present invention can be widely utilized, as the white glass which has not been existed in the past, for housings of portable electronic devices such as a mobile phone, vessels for food or the like, decorative glass and so on.

The invention claimed is:

1. A white glass comprising: in terms of mole percentage on the basis of oxides, from 50% to 65% of $SiO_2$; from 0 to 8% of $B_2O_3$; from 4.0% to 8% of $Al_2O_3$; from 6.0 to 18% of MgO; from 0 to 5% of CaO; from 0 to 10% of SrO; from 0 to 12% of BaO; from 0 to 5% of $ZrO_2$; from 5% to 15% of $Na_2O$; and from 2% to 10% of $P_2O_5$, wherein a total content of CaO, SrO and BaO is from 1% to 22%, a total content RO, which is a total content of MgO, CaO, SrO and BaO, is from 7% to 25%, a ratio CaO/RO, which is a ratio of a content of CaO to the total content RO, is 0.7 or less, and a ratio CaO/$P_2O_5$, which is a ratio of the content of CaO to a content of $P_2O_5$, is 0.59 or less.

2. The white glass according to claim 1, wherein the white glass comprises: in terms of mole percentage on the basis of oxides, from 50% to 65% of $SiO_2$; from 0 to 8% of $B_2O_3$; from 4.0% to 8% of $Al_2O_3$; from 6.0 to 18% of MgO; from 0 to 5% of CaO; from 0 to 10% of SrO; from 0 to 12% of BaO; from 0 to 5% of $ZrO_2$; from 5% to 15% of $Na_2O$; and from 2% to 10% of $P_2O_5$, wherein the total content of CaO, SrO and BaO is from 1% to 15%, the total content RO is from 10% to 25%, the ratio CaO/RO is 0.7 or less, and the ratio CaO/$P_2O_5$ is 0.59 or less.

3. The white glass according to claim 1, wherein the white glass comprises 6.0% less than 11% of MgO.

4. The white glass according to claim 1, wherein the white glass comprises: from 55% to 62% of $SiO_2$; from 4.0% to 7% of $Al_2O_3$; from 6.0% to 10% of MgO; from 8% to 12% of $Na_2O$; and from 3% to 7% $P_2O_5$.

5. The white glass according to claim 1, wherein the white glass comprises 9% or more of $Na_2O$.

6. The white glass according to claim 1, wherein the white glass comprises 0.5% or more of $ZrO_2$.

7. The white glass according to claim 1, wherein the white glass comprises 1% or more of BaO.

8. The white glass according to claim 1, wherein the white glass comprises from 50% to 62.3% of $SiO_2$.

9. The white glass according to claim 1, wherein a crystal is not precipitated in the white glass.

10. The white glass according to claim 1, wherein a linear transmittance of light having a wavelength of 600 nm of the white glass at a thickness of 1 mm is 2% or less.

11. The white glass according to claim 1, wherein the white glass is for use in a building material.

12. The white glass according to claim 11, wherein the white glass which is for an interior use of a gallery or tunnel.

13. A housing comprising the white glass according to claim 1.

14. An electronic device, comprising the housing according to claim 13.

15. The electronic device according to claim 14, wherein the electronic device is a portable communication device or portable information device.

16. A white glass comprising: in terms of mole percentage on the basis of oxides, from 50% to 65% of $SiO_2$; from 0 to 8% of $B_2O_3$; from 4.0% to 8% of $Al_2O_3$; from 6.0 to 18% of MgO; from 0 to 5% of CaO; from 0 to 10% of SrO; from 0 to 12% of BaO; from 0 to 5% of $ZrO_2$; from 5% to 15% of $Na_2O$; and from 2% to 10% of $P_2O_5$, wherein a total content of CaO, SrO and BaO is from 1% to 22%, a total content RO, which is a total content of MgO, CaO, SrO and BaO, is from 7% to 25%, a ratio CaO/RO, which is a ratio of a content of CaO to the total content RO, is 0.7 or less, a ratio CaO/$P_2O_5$, which is a ratio of the content of CaO to a content of $P_2O_5$, is 0.59 or less, and the white glass has a compressive stress layer in a surface thereof.

17. The white glass according to claim 16, wherein the white glass comprises: in terms of mole percentage on the basis of oxides, from 50% to 65% of $SiO_2$; from 0 to 8% of $B_2O_3$; from 4.0% to 8% of $Al_2O_3$; from 6.0 to 18% of MgO; from 0 to 5% of CaO; from 0 to 10% of SrO; from 0 to 12% of BaO; from 0 to 5% of $ZrO_2$; from 5% to 15% of $Na_2O$; and from 2% to 10% of $P_2O_5$, wherein the total content of CaO, SrO and BaO is from 1% to 20%, the total content RO is from 6% to 25%, the ratio CaO/RO is 0.7 or less, the ratio CaO/$P_2O_5$ is 0.59 or less, and the white glass has the compressive stress layer in the surface thereof.

18. The white glass according to claim 16, wherein the white glass comprises: in terms of mole percentage on the basis of oxides, from 50% to 65% of $SiO_2$; from 0 to 8% of $B_2O_3$; from 4.0% to 8% of $Al_2O_3$; from 6.0 to 18% of MgO; from 0 to 5% of CaO; from 0 to 10% of SrO; from 0 to 12% of BaO; from 0 to 5% of $ZrO_2$; from 5% to 15% of $Na_2O$; and from 2% to 10% of $P_2O_5$, wherein the total content of CaO, SrO and BaO is from 1% to 15%, and the total content RO is from 10% to 25%.

19. The white glass according to claim 16, wherein the white glass comprises from 50% to 62.3% of $SiO_2$.

20. The white glass according to claim 16, wherein the compressive stress layer has a thickness of 10 μm or more and a surface compressive stress of the compressive stress layer is 300 MPa or more.

21. The white glass according to claim 16, wherein a total light reflectance of light having a wavelength of 600 nm of the white glass is 45% or more.

22. The white glass according to claim 16, wherein the white glass is for use in a building material.

23. The white glass according to claim 22, wherein the white glass is for an interior use of a gallery or tunnel.

24. A housing comprising the white glass according to claim 16.

25. An electronic device, comprising the housing according to claim 24.

26. The electronic device according to claim 25, wherein the electronic device is a portable communication device or portable information device.

* * * * *